March 17, 1959 D. A. BERESFORD 2,878,433

UNITS FOR SUPPRESSION OF ELECTRICAL INTERFERENCE

Filed Jan. 29, 1953 3 Sheets-Sheet 1

Inventor
D. A. BERESFORD
By [signature]
Attorney

March 17, 1959 D. A. BERESFORD 2,878,433

UNITS FOR SUPPRESSION OF ELECTRICAL INTERFERENCE

Filed Jan. 29, 1953 3 Sheets-Sheet 2

Inventor
D. A. BERESFORD
By R. P. Morris
Attorney

March 17, 1959 D. A. BERESFORD 2,878,433

UNITS FOR SUPPRESSION OF ELECTRICAL INTERFERENCE

Filed Jan. 29, 1953 3 Sheets-Sheet 3

Inventor
D. A. BERESFORD
By [signature]
Attorney

United States Patent Office 2,878,433

Patented Mar. 17, 1959

2,878,433

UNITS FOR SUPPRESSION OF ELECTRICAL INTERFERENCE

Donald Alfred Beresford, London, England, assignor to International Standard Electric Corporation, New York, N. Y., a corporation of Delaware Application January 29, 1953, Serial No. 334,063

Claims priority, application Great Britain February 18, 1952

1 Claim. (Cl. 317—261)

This invention relates to the construction of capacitors, and the principal object of the invention is the production of a capacitor with connecting leads which has a very low value of self-inductance.

The capacitor units to be described have been developed for use as radio interference suppressors but may be used in any situation where a low value of inductance is required.

The inductance of a conventional paper capacitor unit is caused by the inductance of the leads between the terminals and the electrodes, in series with the inductance of the electrodes themselves which latter is due partly to the fact that the connections are made on one edge and at one place on one edge.

One method already known of reducing the value of the inductance of the leads from the actual circuit to the condenser electrodes is to arrange two leads from a point on each electrode to be connected in series in the actual circuit so that the electrode is connected directly to the circuit.

At high frequencies however the remaining inductance is sufficiently great to make the transfer impedance of the capacitor too large for use as an interference suppressor.

The object of this invention is to provide a capacitor in which the transfer impedance is relatively low at high frequencies and so offers a good shunt path to any radio frequency interference.

This is achieved by a capacitor comprising metal electrodes separated by dielectric material in which connections to both sets of electrodes are brought out to two opposite edges of the said electrodes.

Particular embodiments of the invention will now be described with reference to the accompanying drawings in which.

Figure 1:
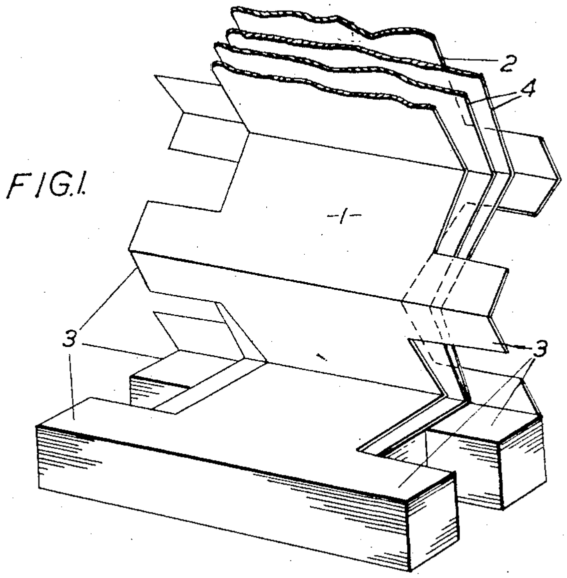
Fig. 1 is a general view of a capacitor constructed by the zig zag folded foil method.

Referring to the drawings; Fig. 1 shows two conducting foil electrodes 1 and 2 shaped with extension pieces 3, spaced equally along their length. These electrodes are interleaved with paper dielectric 4 and folded at the centre of the extension pieces 3, so that a zig-zag pack is formed having four sets of extension pieces. Two sets of these extensions 3 are from one electrode and two from the other so that each electrode may be connected in series in an electric circuit, and it will be seen that when the capacitor is folded there are two conductors constituting the means for connecting the capacitor in an electric circuit, these conductors being formed from the folded over portions of the foils at the place where the extensions 3 are located.

Figures 2, 3:
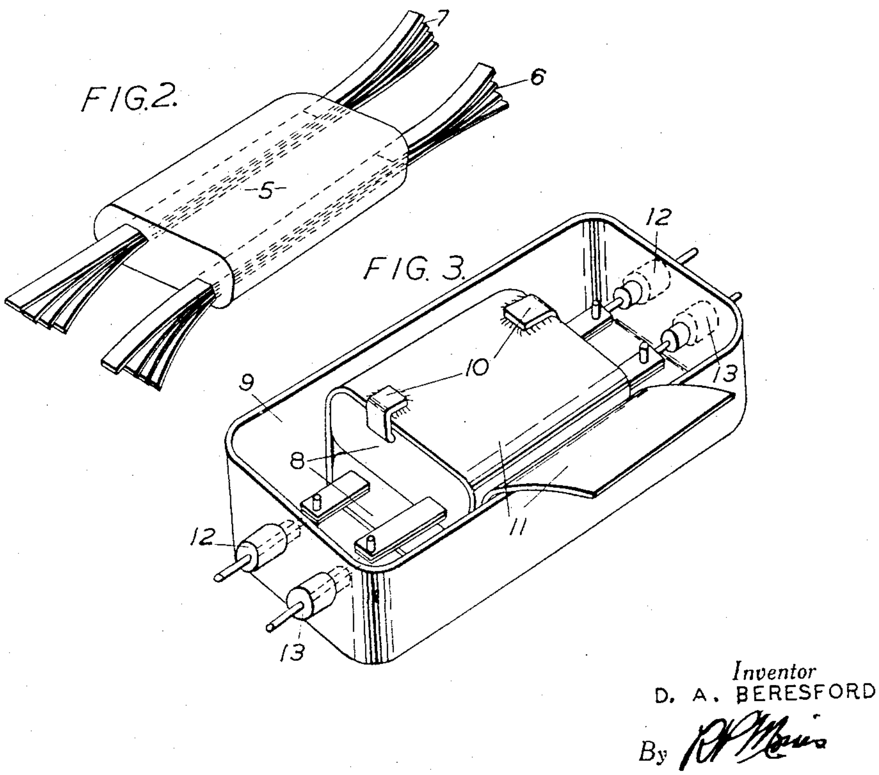
Fig. 2 shows a capacitor constructed by the rolled foil method with lead through tapes inserted.
Fig. 3 shows a unit comprising two capacitors suitable for an electrical interference suppressor unit.

Another arrangement which is shown in Fig. 2 uses the more conventional roll type of paper dielectric foil electrode condenser 5. It is, however, modified by the insertion of conductor tapes 6 and 7 at regular intervals along the length of each electrode. These tapes are so placed that those attached to one electrode form one stack of connectors 6 which project beyond the electrodes, and those attached to the other electrode form a similar stack 7 when the electrodes are wound into a unit.

The position and number of these lead through tapes are important, and in order to reduce the transfer impedance characteristic to less than 1 ohm the minimum number is four for each electrode or 8C where C is the capacitance of the unit in micro-farads, whichever is the greater.

Another factor which governs the number is their current carrying capacity, and providing that they are inserted at regular intervals along the electrode length then the number may be increased to meet this requirement without any adverse effects.

The points at which the tapes are inserted may be determined by some relationship such as:

$$\frac{1.l}{2n}, \frac{3.l}{2n}, \frac{5.l}{2n}, \ldots \frac{(2n-1)l}{2n}$$

where $n$ is the number of tapes inserted on each foil, and $l$ is the length of the foil.

It has been found possible by using this construction, to make units having a transfer impedance of less than 1 ohm over a frequency range of .09 mc./s. to 60 mc./s. for a capacitor of 2 micro-farads.

For a normal offset foil type of capacitor with the same capacitance this characteristic would not be obtained for frequencies above 10 mc./s. The improvement in useful frequency range is thus considerable.

An assembly using this construction is illustrated in Fig. 3, where two of the capacitor units 8 are fitted in a container 9. One electrode of each capacitor is connected to the container via lead through tapes 10 bent over to be in electrical contact with a metal foil 11 wrapped round the two units and making electrical contact with the container 9. The other electrode of each capacitor is connected to terminals 12 and 13 respectively at each end of the container 9 so that they may be connected in series in respective lines, and if the container 9 is earthed a capacitance is presented between each line and earth.

Figure 4:
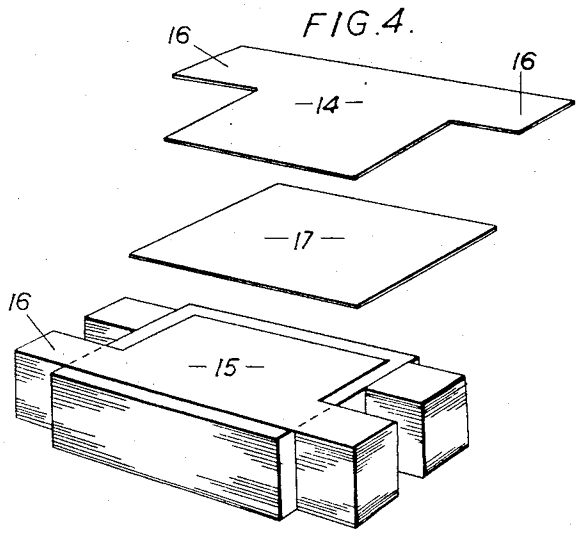
Figs. 4 and 5 show applications of the invention to stack type capacitors.

Another embodiment of this invention is illustrated in Fig. 4. Electrodes 14, 15 are formed with extensions 16 to provide lead through connections, and are stacked alternately and separated by sheets of dielectric material 17. A stack is thus formed similar in appearance to that of Fig. 1 and providing four separate terminals for two lead through connections. It will be seen that if the electrodes be numbered consecutively odd numbered electrodes are connected together at points on the two opposite faces shown to the right and the left of the stack and the even numbered electrodes are connected together at points on the same two opposite faces.

Figure 5:
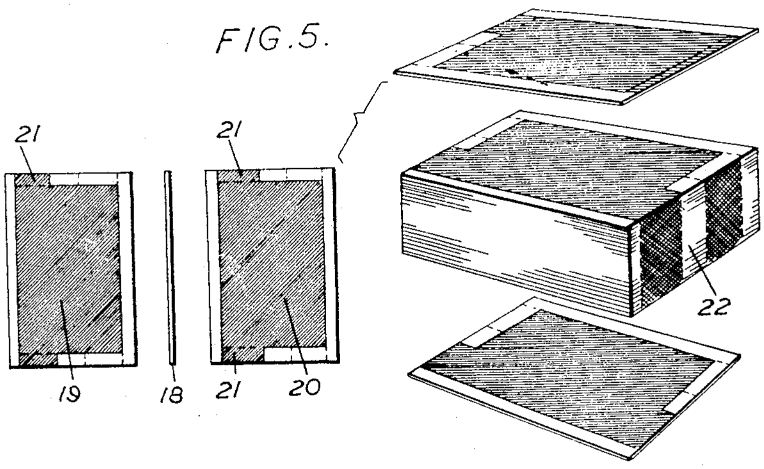

The same principle is applied to silvered mica plate condensers in Fig. 5. A mica plate 18 is coated on the front 19 and back 20 with a layer of silver, of a similar shape to the electrodes previously described in Fig. 4, so that the extensions 21 provide the lead through connections for the electrode.

A number of these silvered plates are then placed in a stack 22, and the extensions bonded together to form two lead through connections as in the embodiments already described.

Figure 6:
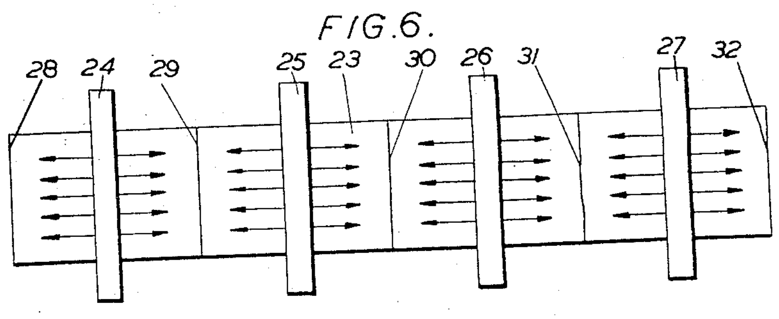
Fig. 6 is a diagrammatic representation of the tapes on one foil.

Fig. 6 is a diagram of one foil electrode 23 unwound, having four tapes 24–27 positioned so that the foil is divided into four equal sections. The directions of the flow of R. F. currents are depicted by arrows on the foil, and if the foil is correctly divided into four equal sections there will be null points of the R. F. currents along the lines 28–32.

The R. F. currents flowing from each tape to the foil will be uniformly distributed along the length of the tape as indicated and therefore the effective inductance of each half of each section between the tapes will be equal and opposite and will thus cancel the effect of each other. These conditions apply to both foils of the unit and hence a complete unit will behave as a parallel connection of four separate units each a quarter of the total capacity and each of a very low value of self inductance.

From this it can be seen that the value of capacitative reactance at any frequency will be that of a capacitor of the nominl total capacity, and the value of self-inductance will be that of the four sections in parallel.

Figure 7:
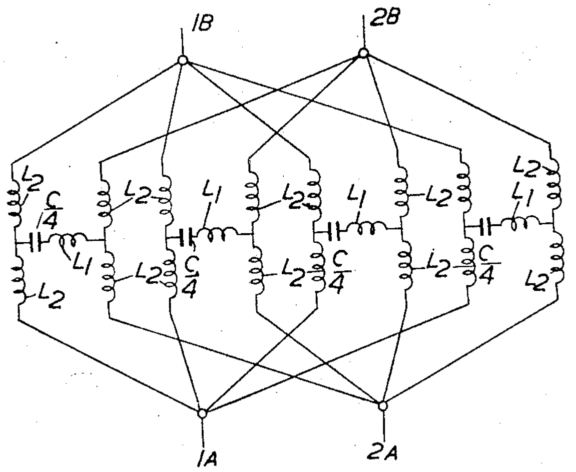
Figs. 7 and 8 are equivalent circuit diagrams of a complete unit.
Figure 8:
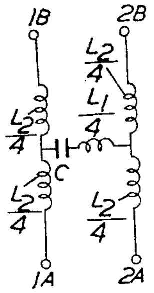

These points are more clearly illustrated in Figs. 7 and 8, which show the equivalent circuit diagram for a complete unit. In the drawing, C is the capacitance of the complete unit, $L_2$ is the inductance of each tape considered as being connected in the input and output to each section of the unit, and $L_1$ is the residual inductance of each section of the unit. The circuit in Fig. 7 comprises four similar networks connected in parallel and thus it can be seen that the effective self-inductance of the unit is reduced to $$\frac{L_1}{4}$$

and the inductance due to the tapes is reduced to $$\frac{L_2}{4}$$

The resultant equivalent circuit is shown in Fig. 8. This shows quite clearly that the only inductance in series with the capacitance C is $$\frac{L_1}{4}$$

The inductance of the tapes which is $$\frac{L_2}{2}$$

in series with each arm does not result in any adverse effect upon the efficiency of the unit as an interference suppressor when connected with arm 1A, 1B in series with one line and 2A, 2B, in series with the other.

While the principles of the invention have been described above in connection with specific embodiments and particular modifications thereof, it is to be clearly understood that this description is made only by way of example and not as a limitation on the scope of the invention.

What I claim is:

An interference suppressor unit comprising two roll-type capacitors positioned side-by-side, each comprising two elongated metal electrodes separated by elongated dielectric strips, at least four metal tape conductors for each electrode, mounted across the width of said electrode in electrical contact therewith and with both ends extending beyond said electrodes, said conductors being spaced apart so that their ends are brought out at given intervals along the lengths of the electrodes and the conductors in contact with each electrode are adjacent each other when said electrodes are rolled, a metal strip encircling both said capacitors, means for connecting both ends of the conductors connected to one electrode of each capacitor to said encircling metal strip, and means for connecting corresponding ends of the other conductors connected to the other electrode of each capacitor together, whereby two lead-through conductors are provided for connecting said unit in an electric circuit.

References Cited in the file of this patent

UNITED STATES PATENTS

| | | |
|---|---|---|
| 1,873,298 | Davis | Aug. 23, 1932 |
| 2,270,953 | Manz | Jan. 27, 1942 |

FOREIGN PATENTS

| | | |
|---|---|---|
| 367,147 | Great Britain | Feb. 18, 1932 |
| 824,181 | France | Nov. 3, 1937 |
| 367,812 | Italy | Feb. 3, 1939 |
| 562,667 | Great Britain | July 11, 1944 |